United States Patent [19]

Dricot

[11] Patent Number: 4,513,649
[45] Date of Patent: Apr. 30, 1985

[54] CUTTING VITROUS SHEET CORNERS

[75] Inventor: Jean-Marie Dricot, Izegem, Belgium

[73] Assignee: Mirodan, Ets. Louis D'Haene & Sons, Kortrijk, Belgium

[21] Appl. No.: 498,777

[22] Filed: May 27, 1983

[30] Foreign Application Priority Data

May 28, 1982 [GB] United Kingdom ................. 8215717

[51] Int. Cl.³ .............................................. B26D 3/08
[52] U.S. Cl. ........................................ 83/883; 83/513; 83/517; 83/597; 83/590; 33/27 R
[58] Field of Search ............................. 33/27 R–27 G; 83/879–887, 490, 513, 516, 517, 519, 598, 610, 612, 597, 917

[56] References Cited

U.S. PATENT DOCUMENTS

| 2,314,535 | 3/1943 | Worden | 33/27 D |
| 2,576,291 | 11/1951 | Fletcher | 33/27 D |
| 2,618,857 | 11/1952 | Goralske | 33/27 D |
| 2,630,630 | 3/1953 | Schunk et al. | 33/27 D |
| 3,125,920 | 3/1964 | Smith | 83/917 X |

Primary Examiner—James M. Meister
Attorney, Agent, or Firm—Spencer & Frank

[57] ABSTRACT

Apparatus for forming arcuate corners on a vitreous sheet, the apparatus including a support for a vitreous sheet, a pair of carriages mounted above the support for relative movement so that the spacing between the carriages can be adjusted, a pair of scoring heads each mounted for arcuate movement beneath a respective carriage, and a mechanism connected for driving the heads in order to score corners of a vitreous sheet located on the support.

10 Claims, 3 Drawing Figures

CUTTING VITROUS SHEET CORNERS

BACKGROUND OF THE INVENTION

The present invention relates to apparatus for use in cutting the corners of a vitreous sheet.

There is an increasing demand for vitreous sheets having rounded corners. Familiar examples of the use of such sheets are as glazings for railway carriages and as mirrors.

Hitherto such sheets have been scored manually using a template and the sheets are then broken along the scored lines.

Such a process is time consuming and requires skilled labour.

SUMMARY OF THE INVENTION

It is an object of the present invention to provide an apparatus for effecting such scoring mechanically.

According to the present invention, there is provided apparatus for use in cutting the corners of a vitreous sheet characterised in that such apparatus comprises a support for a vitreous sheet, a pair of carriages mounted above the support for relative movement so that the carriage spacing can be adjusted, a pair of scoring heads each mounted for arcuate movement beneath a said carriage and means for driving said heads for scoring corners of a vitreous sheet located on said support.

This is a simple apparatus for mechanically effecting arcuate scoring of two corners of a vitreous sheet. By rotation of a said sheet which is rectangular, its other two corners can be similarly scored. The spacing between the two carriages is adjustable, and this gives the advantage that sheets of different sizes can be worked on the same apparatus.

Apparatus as defined above is suitable for scoring arcs of a fixed radius. In preferred embodiments of the invention, each said scoring head is mounted to its carriage by a radius arm whose effective length is adjustable. This gives the advantage that arcs of different radii may be scored. A said scoring head may be fixed to its radius arm, the latter being slidable through its axis of rotation, but it is preferably for the radius arm to be fixed and for the scoring head to be movable along it.

Preferably, both said carriages are movable. This enables the two carriages to be moved towards and away from a fixed side edge position for a sheet on the support so as to allow for scoring arcs of different radii on sheets of different sizes.

Advantageously, said support is provided with edge stops for locating adjacent edges of a said vitreous sheet, so as to define a corner position for that sheet. This greatly simplifies similar successive scoring of vitreous sheets of the same size.

It is preferred that the edge stop(s) for locating at least one edge of a said vitreous sheet is or are adjustable. In the case where the location of that edge of a sheet which extends between the two adjacent corners to be scored is so adjustable, this allows that edge to be firmly positioned an adjustable distance away from the centres of curvature of the arcs to be scored so as to allow for the scoring of arcs of different radii.

Said scoring heads are preferably arranged to lift automatically from a vitreous sheet on the support on completion of their arcuate movement. After such lifting, said scoring heads are preferably automatically returned through their scoring arcs to starting positions.

Advantageously, means is provided for simultaneously driving said scoring heads in their arcuate movement.

In preferred embodiments of the invention, said scoring heads are arranged for their scoring movements to be in opposite senses and towards an edge located by said edge stops.

BRIEF DESCRIPTION OF THE DRAWING

A preferred embodiment of the present invention will now be described by way of example with reference to the accompanying drawings in which.

DESCRIPTION OF THE PREFERRED EMBODIMENTS

Figure 1:
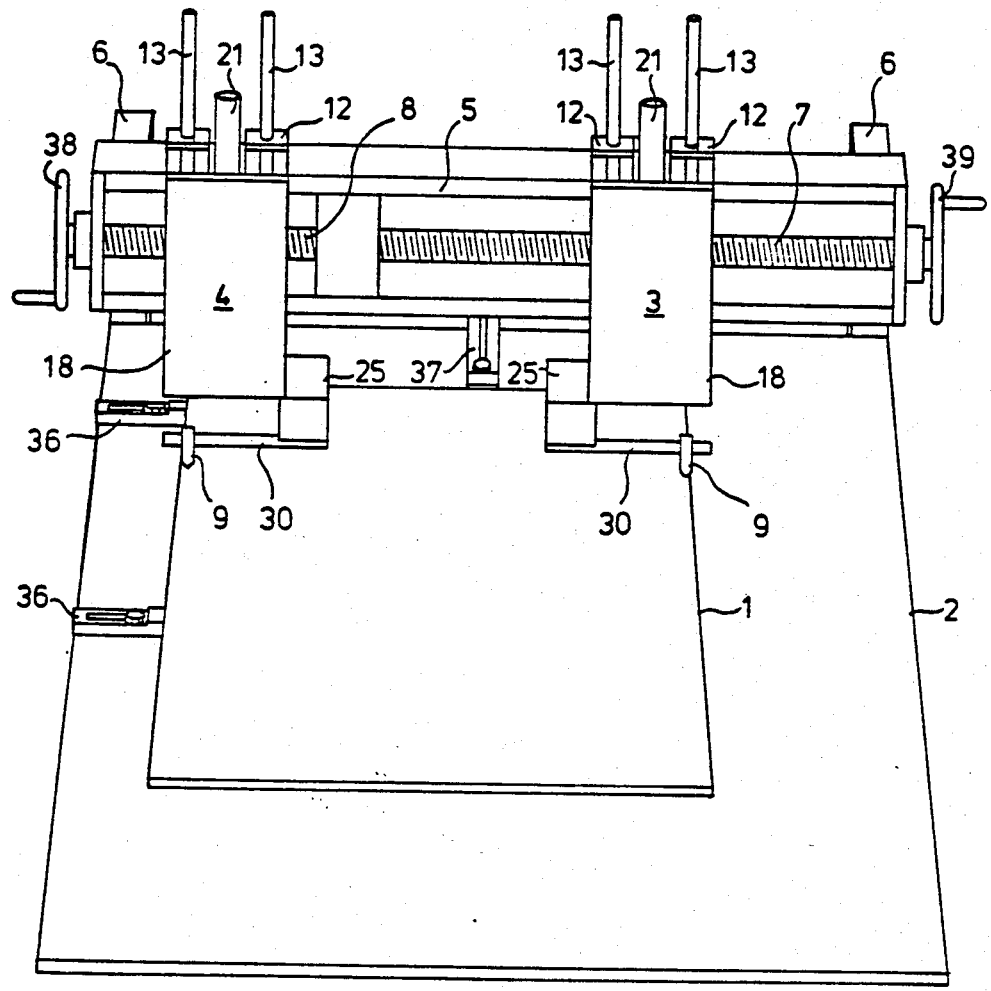
FIG. 1 is a diagrammatic perspective view of an apparatus according to the invention.

In FIG. 1, apparatus for cuttting the corners of a vitreous sheet 1 comprises a support 2 for the vitreous sheet, a pair of carriages 3, 4 mounted on a track 5 fixed by pillars 6 above the support 2 for movement along the track under the control of worms 7, 8 respectively so that the carriage spacing can be adjusted. Scoring heads 9 are mounted for arcuate movement, one beneath each carriage 3, 4 for scoring a corner of the vitreous sheet 1 located on the support.

The carriages 3 and 4 and their associated scoring heads 9 are arranged as mirror images one of the other for arcuately scoring adjacent corners of the vitreous sheet 1 and their corresponding parts are allotted similar reference numerals.

Figure 2:
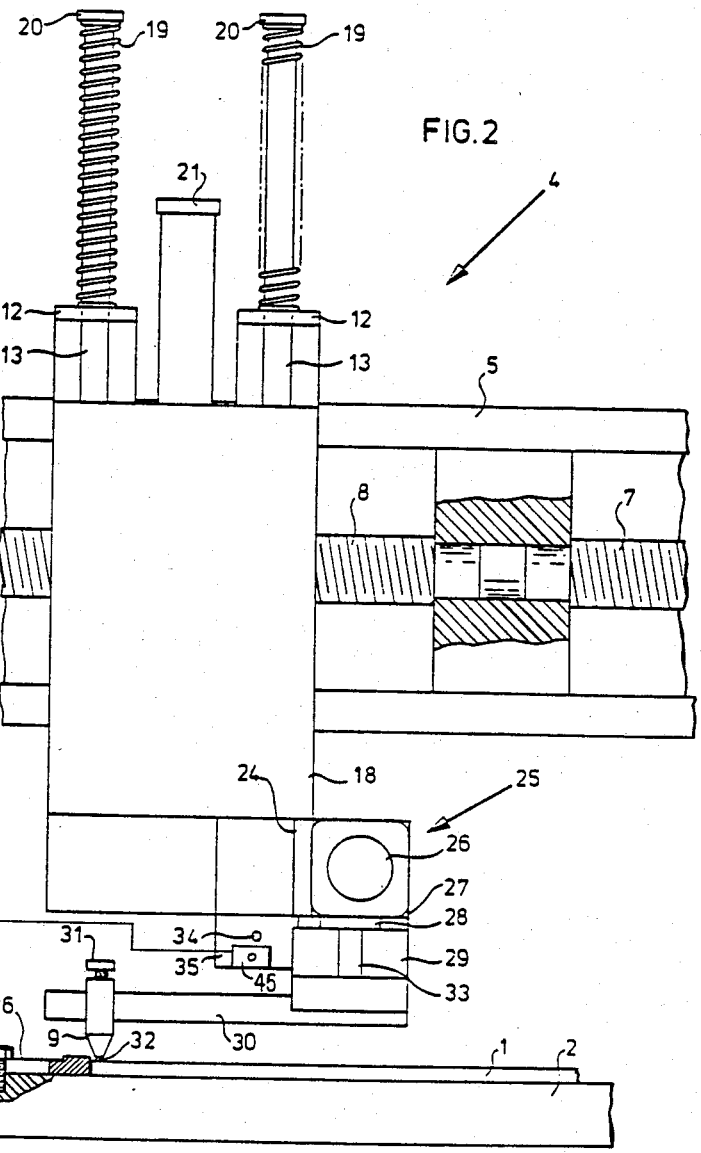
FIG. 2 is a front elevation of a detail of FIG. 1.
Figure 3:
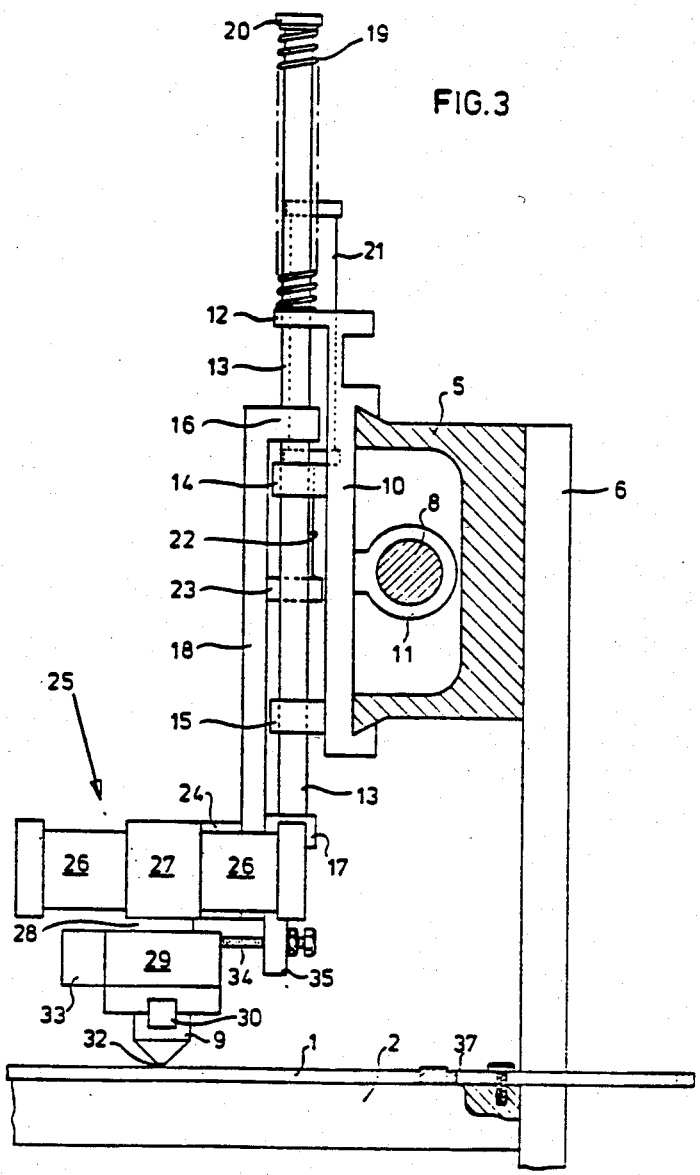
FIG. 3 is a side elevation of the detail of FIG. 2.

The carriage 4 is shown in greater detail in FIGS. 2 and 3.

The carriage 4 comprises a back plate 10 which slides on the track 5 and is fast to a collar 11 which engages the worm 8 whereby it can be moved along the track. At the top of the back plate 10 there is provided a pair of forwardly extending brackets 12 each of which guides a vertically slidable pillar 13. Each pillar 13 is further guided by lower brackets 14, 15 attached to the front face of the back plate 10. Each pillar is fixed to upper and lower brackets 16, 17 attached to the rear face of a front plate 18 of the carriage 4. A coil spring 19 surrounds each pillar 13 between the bracket 12 at the top of the back plate 10 and an end stop 20 at the top of each pillar 13 to bias the pillars and thus the front plate 18 to an upward position. The front plate 18 is movable downwardly into a scoring position as shown by a pneumatic ram whose cylinder 21 is mounted on the back plate 10 and whose actuator rod 22 is attached to a bracket 23 attached to the rear face of the front plate 18.

The right hand side of the base of the front plate 18 carries a bracket 24 which mounts a scoring assembly generally indicated at 25.

The scoring assembly 25 comprises a double acting pneumatic ram 26 including a housing 27 within which is located a rack (not shown) which is drivable by the ram 26. A pinion (not shown) is mounted within the housing 27 for engagement by the rack. The pinion is fast to an axle 28 which projects from beneath the housing and carries a support 29 for a radius arm 30 which in turn carries the scoring head 9 of the carriage 4. The scoring head 9 is slidable along the radius arm 30 and may be fixed in any desired position by a locking screw 31. The actual scoring point 32 of the scoring head 9 may be constituted by one of a plurality of metal cutting-wheels or by a diamond or by another such device as is well known per se in the art. The radius arm 30 is preferably marked along its length, for example in millimeters, to facilitate accurate setting of a desired scoring arc radius.

An abutment 33 projects from the radius arm support 29 for engagement with an adjustable stop 34 carried by a mounting 35 fixed to the front plate 18 of the carriage 4 to limit arcuate movement under the control of the ram 26.

The position of a corner of a vitreous sheet 1 to be cut is located beneath the carriage 4 by side edge stops such as 36 (FIGS. 1 and 2) and by rear edge stops such as 37 (FIGS. 1 and 3).

In order to cut the corners of a vitreous sheet, such as 1, the scoring heads 9 are first correctly located on their radius arms to give the desired radius of arc. Rear edge stops 37 are then adjusted to define a position for the rear edge of the sheet 1 which lies behind the centre of the arc to be scored by a distance which is marginally greater (for example by about 1 mm) than the radius of that arc. This adjustment is facilitated if the rear edge stops 37 each bear a scale relative to datum points on the support 2 which corresponds with various scoring radius settings. Of course, the scales may be on the support 2 and the datum points on the stops.

The sheet 1 may then be located on the support 2 against the side edge stops 36 and the rear edge stops 37. This location process is facilitated if the support 2 is pierced with a plurality of holes through which air may be forced from a plenum chamber beneath the support 2, so that the sheet 1 may be "floated" into position. Such a system is not shown in the drawings because it is very well known in the art.

The relative positions of the side edge of the sheet 1 which lies against side edge stops 36 and the scoring point 32 of the scoring head 9 carried by the carriage 4 are then adjusted so that on lowering, the scoring point 32 will commence scoring just inside the edge of the sheet 1, for example about 1 mm inside the edge. This can be done by turning worm crank handle 38 to rotate the worm 8 and thus to move the carriage 4. Alternatively, or in addition, if the side edge stops 36 be adjustable, they can be repositioned and the sheet 1 relocated accordingly. Finally, the position of carriage 3 is adjusted by worm crank handle 39 and worm 7 so that its scoring point lies just inside the opposite end of the vitreous sheet 1.

It will be apparent that it is desirable for the stopped location of the rear edge of the sheet 1 to be adjustable over the same range as the scoring radius. This can be achieved by using rear edge stops which are continuously adjustable over that range or by using stops which are adjustable over a shorter range in conjunction with auxiliary spacer stops.

It will also be apparent that the apparatus may be used solely for making arcuate scores of a constant radius. In such a case there is no need for adjustability of any of the edge stops 36, 37, and the carriage 4 may also be fixed in position.

Of course in series production, such adjustment of the edge stops and/or of the carriages 3, 4 is only required when it is desired to alter the radius of curvature and/or the size of the sheets to be cut.

After the necessary positioning, the rams 21 of the carriages 3, 4 are actuated to lower their front plates 18 and scoring assemblies 25 against the action of the springs 19. These lowering rams 21 are suitably powered by air from a common source, the air pressure being carefully regulated so as to exert the correct scoring pressure.

After the scoring points have contacted the upper surface of the vitreous sheet 1, the ram 26 of each scoring assembly 25 is actuated to rotate the radius arm holders 29, through 90° in the case where rectangular sheets are being cut, so that the scoring points 32 each make an arcuate score on the surface of the sheet. As has previously been stated, the scoring points 32 make their initial contact with the sheet just inside its edges. If the points 32 were located precisely at the edges, or just outside them, problems would arise in starting the score. These problems are avoided by starting inside the edges. Of course when the sheet is subsequently broken along the score lines, there will be left small shoulders at the start (and end) of each score line, but these can be removed in a subsequent edge grinding operation if necessary or desirable. The rams 26 are preferably actuated simultaneously, preferably from a common air supply.

Considering FIG. 1, the scoring head 9 of carriage 3 moves in an anti-clockwise direction towards the rear edge of the vitreous sheet 1, while the scoring head 9 of the other carriage 4 moves clockwise towards that edge. Thus sideways forces on the vitreous sheet due to the scoring are balanced, and rearward forces are resisted by the rear edge stops 37 so that there is no tendency for the sheet to move during the scoring operation.

On completion of scoring, abutment 33 comes up against stop 34 (FIGS. 2 and 3), and air pressure to the rams 26 may be released through a bleed valve (not shown) in known manner. At this stage, air pressure to the lowering rams 21 is cut off so that the carriage front plates 18 and their scoring assemblies 25 are lifted by the springs 19. This cutting off of air pressure to the lowering rams 21 may for example be initiated by the tripping of switches mounted on the scoring assemblies 25, by timer means associated with the air supply system, or by air flowing through bleed valves of rams 26 when such valves are present.

By way of example, as shown in FIG. 2, a contact switch 45 can be mounted on mounting 35 to be actuated by abutment 33 when scoring head 9 reaches the end of its arcuate movement. Actuation of switch 35 is sensed in an electropneumatic control 46 which first cuts off air pressure to the associated ram 21 and then, after a selected delay, supplies air to the associated ram 26 to return arm 30 to its starting position.

After raising of the scoring assemblies 25, the rams 26 may be reverse actuated to return the radius arms 30 to their starting positions. This can also be done automatically.

The vitreous sheet 1 may then be rotated to score its other corners if desired.

The vitreous sheet 1 is then broken along the scored arcs in the usual way and its edges may be ground if desired.

In the event that it is desired to score all four corners of a rectangular vitreous sheet simultaneously, the support 2 may be provided with a second track such as 5 mounting carriages such as 3 and 4 on the opposite side of the support to that of the track illustrated. Such a second track and its carriages may be arranged as mirror images of the first track 5 and its carriages 3,4. In order to accommodate different sizes of vitreous sheets, one or each track may be movable parallel with itself towards and away from the other track.

I claim:

1. Apparatus for cutting the corners of a vitreous sheet, said apparatus comprising a support for a vitreous sheet, a pair of carriages mounted above the support for relative movement so that the spacing between said carriages can be adjusted, a pair of scoring heads each mounted for arcuate movement beneath a respective carriage, and means connected for driving said heads so that their arcuate movements are in respectively opposite senses for scoring corners of a vitreous sheet located on said support.

2. Apparatus according to claim 1, wherein each said scoring head is mounted to its respective carriage by a radius arm whose effective length is adjustable.

3. Apparatus according to claim 1, wherein both said carriages are movable.

4. Apparatus according to claim 1, wherein said support is provided with edge stops for locating adjacent edges of a vitreous sheet.

5. Apparatus according to claim 4, wherein at least one said edge stop for locating at least one edge of a vitreous sheet is adjustable.

6. Apparatus according to claim 1, wherein said scoring heads are arranged to lift automatically from a vitreous sheet on the support on completion of their arcuate scoring movement.

7. Apparatus according to claim 6, wherein after such lifting said scoring heads are automatically returned through their scoring arcs to a starting position.

8. Apparatus according to claim 1, further comprising means connected for simultaneously driving said scoring heads in their arcuate movement.

9. Apparatus according to claim 4, wherein said scoring heads are arranged for their scoring movements to be towards an edge located by said edge stops.

10. Apparatus according to claim 9, wherein after such lifting said scoring heads are automatically returned through their scoring arcs to a starting position.

* * * * *